July 22, 1969   C. JONES   3,456,626
COMPENSATED SEAL STRUCTURE
Filed March 8, 1968   3 Sheets-Sheet 1

INVENTOR.
CHARLES JONES
BY Raymond P. Wallace
AGENT

July 22, 1969 C. JONES 3,456,626
COMPENSATED SEAL STRUCTURE
Filed March 8, 1968 3 Sheets-Sheet 2

INVENTOR.
CHARLES JONES
BY Raymond P. Wallace
AGENT

July 22, 1969   C. JONES   3,456,626
COMPENSATED SEAL STRUCTURE
Filed March 8, 1968   3 Sheets-Sheet 3

INVENTOR.
CHARLES JONES
BY Raymond P. Wallace
AGENT

United States Patent Office 3,456,626
Patented July 22, 1969

3,456,626
COMPENSATED SEAL STRUCTURE
Charles Jones, Hillsdale, N.J., assignor to Curtiss-Wright Corporation, a corporation of Delaware
Filed Mar. 8, 1968, Ser. No. 711,654
Int. Cl. F01c *19/02;* F02b *55/02*
U.S. Cl. 123—8                                    7 Claims

ABSTRACT OF THE DISCLOSURE

In a rotary combustion engine, the contact pressure of the apex seals of the rotor against the inner surface of the peripheral wall is relieved at high engine speeds, by an inertia device responsive to centrifugal force which clamps the seals at a relieved position.

BACKGROUND OF THE INVENTION

This invention relates to rotary mechanisms and is particularly directed to a seal structure for such mechanisms.

Such a rotary mechanism comprises a hollow outer body having spaced end walls interconnected by a peripheral wall to form a cavity therebetween and having an axis along which the end walls are spaced. The inner surface of the peripheral wall defines a multi-lobed profile which, in the form of mechanism described, is basically an epitrochoid. An inner body or rotor is supported for relative rotation within the outer body cavity. The rotor has an axis which is parallel to but laterally spaced from the outer body axis and has end faces disposed adjacent to and in sealing cooperation with the end walls. The outer peripheral surface of the rotor has a plurality of apex portions in sealing cooperation with the adjacent inner surface of the peripheral wall forming a plurality of working chambers therebetween. Each apex portion of the rotor has means for sealing being radially movable and urged into engagement with the peripheral wall. Patent No. 3,033,180, issued May 8, 1962, discloses sealing means for such a rotary mechanism.

In general, the invention is directed to a rotary engine configuration in which the inner body has a plurality of seals circumferentially spaced about its external periphery. These seals are engageable with the inner surface of the outer body peripheral wall. The centrifugal forces of these seals are variable both in sense and magnitude. In the rotary engine of the above-mentioned patent, the multi-lobed profile of the peripheral wall has alternate concave and convex portions. As more fully explained hereinafter, as the rotor rotates relative to the outer body, the centrifugal forces of each apex seal of the rotor are alternately directed inwardly and outwardly relative to the rotor.

With respect to the outwardly directed centrifugal force, as rotor speeds are increased the force of the apex seal against the peripheral wall increases. Such centrifugal force, if excessive, causes undue frictional wear of the peripheral wall and apex seals, and decreases overall engine efficiency.

An object of the invention is to provide novel means to compensate for the variable effects of centrifugal forces of the apex seals of the rotor.

A further object of the invention is to provide means to prevent excessive frictional wear of apex seals and the peripheral wall.

Still another object of the invention is to increase the efficiency of rotary combustion engines.

SUMMARY

A rotary combustion engine has a rotor rotatably mounted within a cavity. The rotor has a plurality of apex portions. The profiles of the rotor and the peripheral wall of the cavity, taken together, define a plurality of working chambers. In addition, the rotary engine has means for sealing the apex portions with the peripheral wall which includes a seal-forming means, such as a seal strip, carried by the rotor which forms a seal between the apex portions and the peripheral wall, and is radially movable relative to the rotor for maintaining sealing contact with the peripheral wall. Means are provided for reducing the contact pressure of the seal-forming means under certain conditions. The force-reducing means includes weight means and urging means. The weight means responds to forces acting substantially radially with respect to the axis of rotation of the rotor. The urging means responds to the response of the weight means and urges at least part of the seal-forming means into pressing engagement with the rotor so that the seal-forming means is retained in a substantially fixed position with respect to the rotor for a least a portion of the rotor rotation.

DESCRIPTION OF THE PREFERRED EMBODIMENT

The invention is illustrated and described in connection with a particular type of rotary internal combustion engine. It will be obvious, however, that the invention is also applicable to other rotary mechanisms and to rotary mechanisms for use as fluid pumps and fluid motors.

Figure 1:
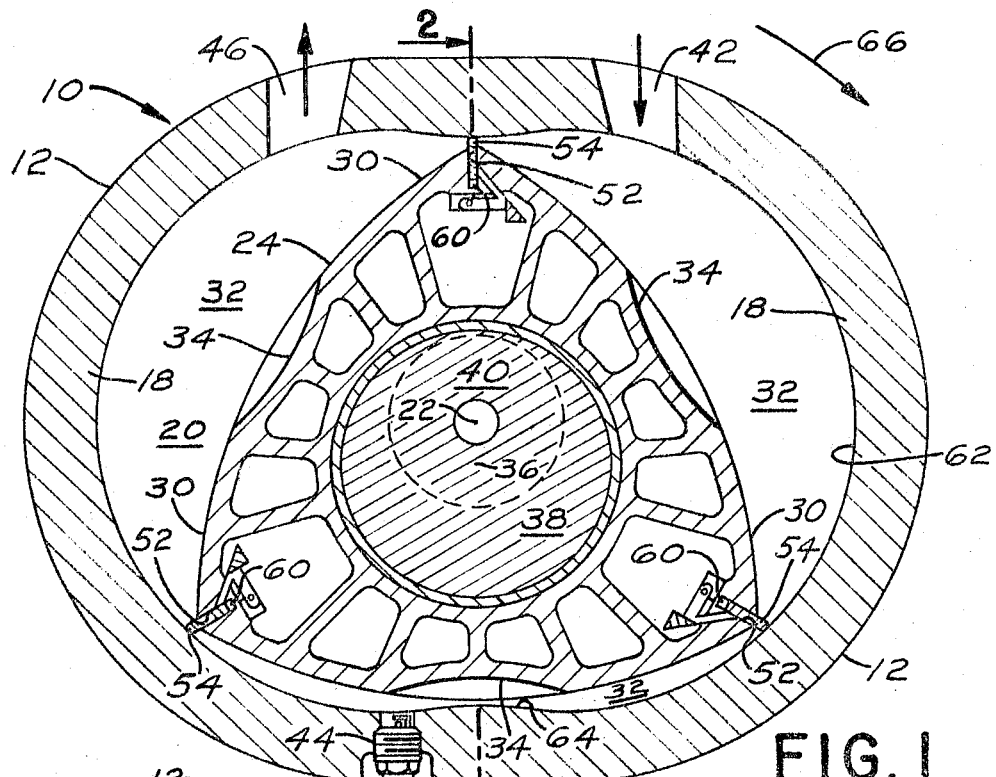
FIG. 1 is a sectional view of a rotary engine of FIG. 2 taken along the line 1—1 and looking in the direction of the arrows.
Figure 2:
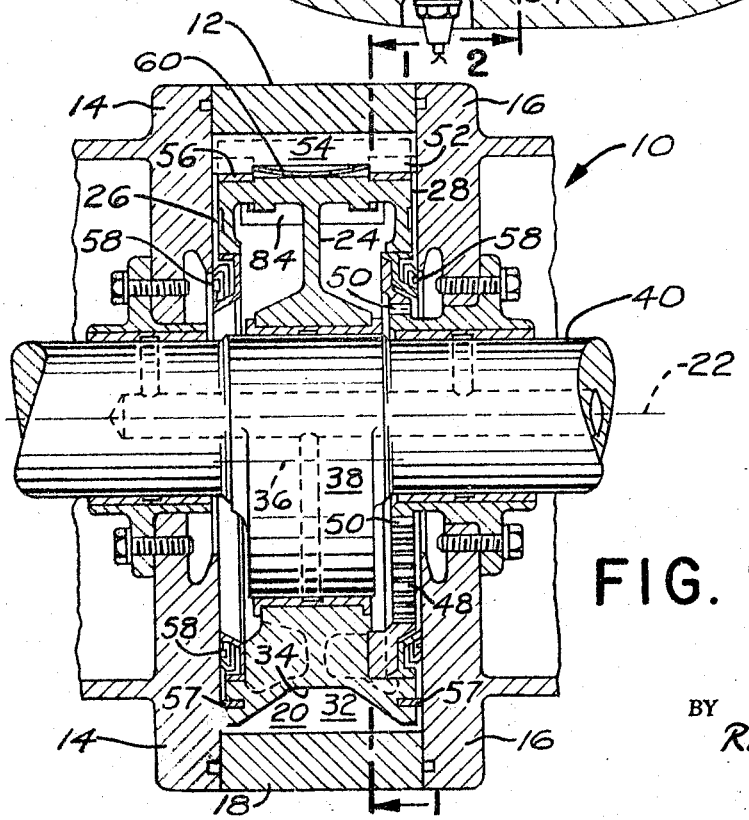
FIG. 2 is a sectional view of the engine of FIG. 1 taken along line 2—2 and looking in the direction of the arrows.

Referring first to FIGS. 1 and 2 of the drawing, a rotary internal combustion engine is generally indicated by the reference numeral 10. The engine 10 comprises an outer body 12 having axially-spaced end walls 14 and 16 and a peripheral wall 18 connected therebetween to form a cavity 20. As viewed in a plane transverse to the axis 22 of the cavity 20 (indicated in FIG. 1), the multi-lobed profile of the cavity 20, in the preferred form, is basically an epitrochoid. As illustrated herein, the cavity profile has two lobes. However, as will appear, the invention is not limited to a rotary engine having this specific arrangement.

An inner body or rotor 24 is disposed within the cavity 20 of the outer body 12. The rotor 24 has axially spaced end faces 26 and 28 disposed adjacent to and in sealing cooperation with the end walls 14 and 16. In addition, the rotor 24 has a plurality of circumferentially-spaced apex portions 30 which preferably are one more in number than the number of lobes of the cavity 20. Thus, as illustrated, the cavity 20 has two lobes and rotor 24 has three apex portions 30. The outer periphery of the rotor 24 has a generally triangular profile. The apex portions 30 are in sealing engagement with the inner surface of the peripheral wall 18 to form a plurality of working chambers 32 (three are shown) between the rotor 24 and the outer body 12.

Each working chamber 32 includes a trough or channel 34 in the adjacent peripheral or working face of the rotor 24, for transfer of gases across the cusp of the epitrochoid. The geometrical axis 36 of the rotor 24 is offset from and is disposed parallel to the cavity axis 22.

In the engine 10 illustrated, the outer body 12 is stationary while the rotor 24 is journaled on an eccentric portion 38 of a shaft 40. The axis of the shaft 40 is coaxial with the cavity axis 22. (The cavity axis 22 is hereinafter referred to as the shaft axis.) Upon rotation of the rotor 24, relative to the outer body 12, the working chambers 32 vary in volume. An intake port 42 is provided in the peripheral wall 18 for admitting air and fuel into the working chambers 32; the intake port may also be located in one or both side walls. A spark plug 44 is provided for igniting the combustion mixture. An exhaust port 46 is provided in the peripheral wall 18 for discharge of exhaust gases from the working chambers 32. As shown in FIG. 1, the rotor 24 turns clockwise in the direction of the arrow 66.

The working chambers 32 have a cycle of operation including the four phases of intake, compression, expansion, and exhaust. The phases are similar to the four-stroke cycle of a reciprocating-type internal combustion engine. It is again emphasized that, although the preferred embodiment disclosed herein is an epitrochoidal rotary engine, the invention is not limited to this specific type of rotary mechanism.

In order to maintain the position of the rotor 24 relative to the outer body 12, an internal ring gear 48 is coaxially secured to the rotor 24. The ring gear 48 is disposed in meshing engagement with a fixed pinion gear 50 secured to the end wall 16. The pinion gear 50 is coaxial with the shaft 40. In the embodiment illustrated, the meshed pinion and ring gears 48 and 50, respectively, have a gear ratio of 2 to 3.

For efficient engine operation, the working chambers 32 should be sealed. For this purpose a groove or slot 52 extends radially inwardly from each apex of the rotor 24 and runs from one end face 26 to the other end face 28, parallel to the rotor axis 36. An apex seal 54 is in each groove 52 and is in sealing engagement with the inner surface of the peripheral wall 18. As illustrated, each apex seal 54 comprises a single strip of metal which extends to both end walls 14 and 16 and is in sealing engagement with the peripheral and end walls 18, 14, and 16, respectively. The invention, as disclosed herein, is not limited to this particular type of apex seal structure and may be applied to variations thereof. One such structure is shown in copending application, Ser. No. 575,481, filed July 21, 1966.

Each apex slot 52 has a cylindrically-shaped enlarged portion at each end disposed radially inwardly of its outer edge. Within the enlarged portions are apex seal pins 56 (shown in sectional view in FIG. 2). Each apex seal pin 56 has a slot in register with rotor slot 52 for receiving the radially inner edge of the adjacent end of an apex seal 54.

Each rotor end face 26 and 28 has a plurality of end face seal strips 57 (shown in FIG. 2). Each of these seal strips 57 extends between a pair of adjacent seal pins 56 and cooperates with the apex seal pins 56 to provide a continuous gas seal between the end faces 26 or 28 and the end wall 14 or 16, adjacent thereto. Also, each end face 26 and 28 preferably has an oil seal arrangement 58 (shown in FIG. 2) disposed adjacent to its inner periphery.

The apex seals 54, the apex seal pins 56, and the end face seal strips 57 cooperate to form a continuous seal around each working chamber 32 between the rotor 24 and the outer body 12.

The apex seals 54 are not rigidly retained within the rotor 24. Instead each apex seal 54 is radially movable into and out of its slot 52 in order to maintain contact with the peripheral wall 18 notwithstanding the presence of bearing clearance, thermal distortions, and other inaccuracies. In addition, the seal slot 52 is slightly wider than the seal to permit lateral freedom of the seal. A suitable spring 60 may be provided in the slot under each apex seal 54 for urging it radially outwardly to insure contact with the peripheral wall 18.

The multi-lobed inner surface of the peripheral wall 18 has circumferentially-spaced concave portions or lobes 62 interconnected by circumferentially-spaced convex surface portions 64. As an apex seal 54 moves along a concave surface portion 62, it tends to move outwardly into contact with the peripheral wall 18. When, however, the apex seal 54 moves along a convex surface portion 64, it tends to move inwardly out of contact with the peripheral wall 18. This tendency to change the direction of the radial movement is a result of changes in the direction of the centripetal and centrifugal forces acting on these apex seals 54. These seal forces are generated as a result of the rotational path each apex seal 54 is forced to travel as a result of being confined in a slot 52 at a rotor apex portion 30. Hence, each apex seal 54 is forced to travel along the epitrochoidal path substantially defined by the peripheral wall 18 subject, however, to limited radial movement as permitted within its apex slot 52.

Figure 3:
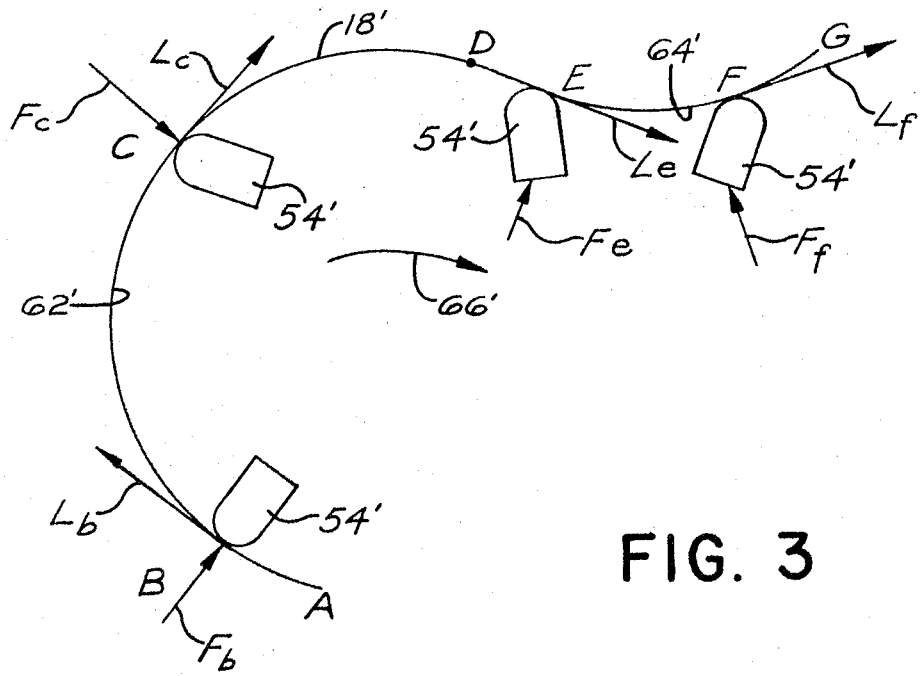
FIGS. 3 and 4 are schematic representations of a body tracing an epitrochoidal path.
Figure 4:
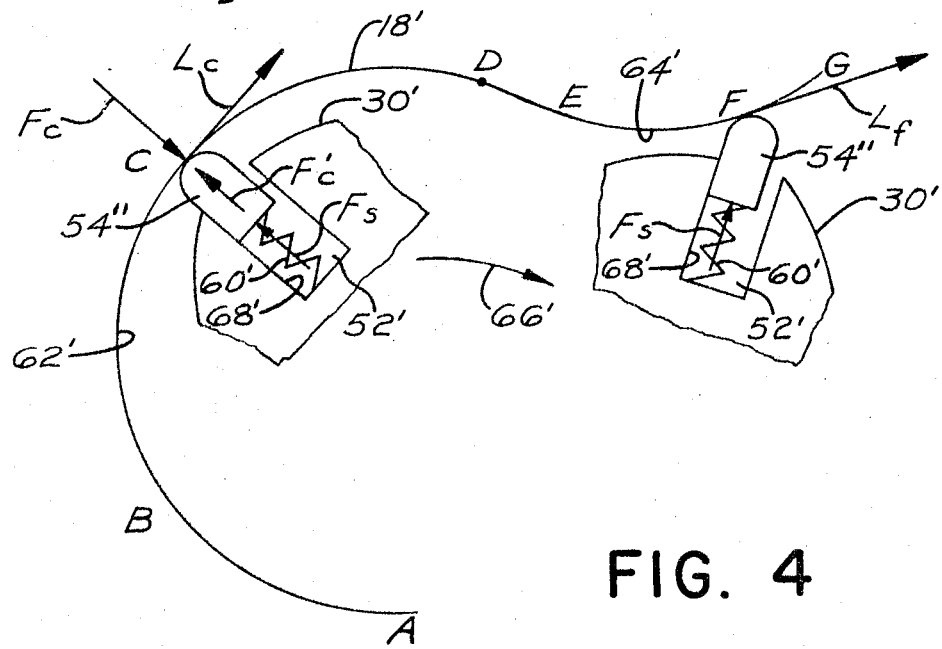

To more clearly describe the nature of the radial forces acting on the seals, the following discussion is made in connection with the schematic views of FIGS. 3 and 4.

In discussing the effect of forces upon a body, it is customary to consider that body as removed from all surrounding constraints. Each constraint is replaced by a force indicating its effect on that body. The resulting body is known as a "free body"; the study of forces with respect to that body is known as a "free body analysis." It is well kniwn that a free body analysis can be made of a mechanical body. In this manner, a free body analysis can be made, for example, of a rotor or any part carried by the rotor, such as the apex seals. In the following discussion, a free body analysis is made of the apex seals 54 carried by the rotor 24. Primed reference numerals are used in FIGS. 3 and 4 to indicate parts which are similar to parts of the rotary engine 10 of FIGS. 1 and 2.

Newton's First Law of Motion states that: A body at rest remains at rest, and a body in motion continues to move at constant speed along a straight line, unless there is a resultant force acting upon the body.

A body moving in a curved path is accelerated because its velocity is changing continually in direction, even though the body travels at a constant speed. This change is one of direction or sense and not magnitude. Thus, if the path is continually changing in direction, additions are continually being made to it even though the magnitude of the velocity remains the same.

If a body is to proceed from one point to another point on a curved path, maintaining the same magnitude of velocity at both points, an added force will be required. An acceleration is associated with and has the same sense as the added force. The sense of this added velocity and acceleration is toward the center of curvature of the path.

The acceleration toward the center of curvature of the path is called "centripetal acceleration." It is well known that force is equal to mass times the acceleration. Thus, a force can be assumed to be acting upon the body; this force is also directed toward the center of curvature and is called "centripetal force."

Since for any action there is an equal and opposite reaction (Newton's Third Law of Motion), the moving body exerts an equal and opposite force upon the constraining agent in a direction radially away from the center of curvature. This reaction to the centripetal force is called "centrifugal force." Said in other words, when a body moves in a curved path, the force *upon* that body acting in a direction toward the center of curvature of that path is called "centripetal force"; the force *applied* by the body in reaction to the centripetal force, is termed "centrifugal force."

There is shown in FIGS. 3 (and 4), a free body 54' (54"), which can be of any shape (shown in the general shape of an apex seal 54), traveling along a curved path from point A toward point G in the direction of arrows 66'. The curved path A–G is in the form of a compound curve (similar to the profile of the peripheral wall 18 shown in FIG. 1) in which the direction of curvature reverses at an inflection point D. The free body 54' is shown in FIG. 3 at four typical positions along this curve A–G, namely at points B, C, E, and F.

An arrow L*b* is a straight line tangent to the curved path at point B and indicates the instantaneous direction of travel of the free body 54'. If the free body 54' is to travel along the curved path A–G from point B, rather than in the direction of the arrow L*b*, a centripetal force must be applied to it. This force, represented by the arrow F*b*, provides the free body 54' with an inward component of motion toward the instantaneous center of curvature of the path at point B.

In the same manner, the arrow L*c* is a straight line tangent to the curve and indicates the instantaneous direction of travel of the body 54' at point C. If the free body 54' is to travel along the curved path A–G from point C, rather than in the direction of arrow L*c*, a centripetal force must be applied to provide the free body 54' with an inward motion toward the instantaneous center of curvature of the curved path at point C.

Thus, a force directed toward the instantaneous center of curvature must be applied to constrain the free body 54' to follow the curved path A–G instead of following a straight line tangent to the path A–D.

Consider now the situation at the point E. Point E is just beyond the point of inflection D on the path A–G. The arrow L*e* is a straight line tangent to the curve at point E and indicates the instantaneous direction of travel of the free body 54'. Once again, if the free body 54' is to travel along the curved path A–G to G from point E, rather than in the direction of the arrow L*e*, a centripetal force, represented by the arrow F*e*, must be applied. This force F*e* provides a component of motion directed inwardly toward the instantaneous center of curvature of the curved path A–G at point E. It should be noted that the curvature of the path A–G reverses beyond the inflection point D. Therefore, the instantaneous centers of the path portion D–G are on an opposite side from the instantaneous centers of the portion A–D of the path A–G.

At point F, the situation is substantially the same as at point E. The arrow L*f* is a straight line tangent to the curve and indicates the instantaneous direction of travel of the free body 54' at point E. If the free body 54' is to travel along the curved path A–G, rather than in the direction of the arrow L*f*, a centripetal force represented by the arrow L*f*, must be applied to the body 54' to provide an inward motion toward the instantaneous center of curvature of the curved path at point F.

As the body 54' passes along the path A–G, it tends to travel in a straight line tangent to the curved path at any instantaneous point. In order that the body 54' be constrained to travel along the curved path A–G, a centripetal force must be applied at each instantaneous point. Since, as has been previously explained, the direction of the required centripetal force is always toward the instantaneous center of curvature of the compound curved path A–G of travel of the free body 54', and since the instantaneous centers will be found first on one side and then on the other side of the path A—G, then the direction of the centripetal forces constraining the moving free body 54' must reverse as the body travels past the inflection point D.

As explained above, centrifugal force is a reaction force of a body, equal and opposite to the centripetal force upon it; therefore, it follows that, if the centripetal force upon the free body 54' reverses direction as the free body 54' travels past the inflection point D, the centrifugal force of that free body 54' must reverse as well.

Both FIGS. 3 and 4 show the compound curve A–G (substantially in the form of a portion of the profile of the epitrochoidal surface of the peripheral wall 18 of FIG. 1). For simplicity in FIG. 4 a seal body 54" (the free body 54' of FIG. 3) is shown only at points C and F. This seal body 54" is illustrated as being within a slot 52' of an apex portion 30' of a rotor 24'.

For purposes of the discussion, the apex seals 54" of FIG. 4 are assumed to be being pushed by a side wall 68' of the slot 52' at a constant linear speed along the compound curved surface A–G of a peripheral wall 18'. In common practice, however, the apex seals 54, due to the motion of the rotor 24, will move at varying speeds. Such changes will not vary the sense of the forces being discussed herein. As indicated above with reference to FIG. 3, the sense of the centripetal forces will be directed toward the instantaneous center of curvature. For example, at point C, in the absence of a peripheral wall 18' of an outer body (and neglecting friction between the seal body 54" and the walls of the slot 52'), the seal body 54", pushed by the rotor 24', would travel in a straight line in the direction of the arrow L*c*. The peripheral wall 18', however, prevents the seal body 54" from traveling in such a direction. The wall 18' forces or constrains the seal body 54" to travel along the curved path A–G. Thus, at point C, as well as at each instantaneous point along the portion of the curved path A–D, the centripetal forces of the peripheral wall 18' constrain the seal body 54". The equal and opposite centrifugal force to the centripetal force is shown in FIG. 4 by the arrow F'*c*.

Similarly, at point F the seal body 54", in the absence of a centripetal force, would travel along a straight line in the direction of the arrow L*f*. As shown in FIG. 3, a centripetal force at point F (arrow F*f* shown in FIG. 3) is directed toward the instantaneous center of curvature and outwardly relative to the rotor axis 36 and shaft axis 22 (shown in FIG. 1).

The peripheral wall 18' cannot provide an outward centripetal force on the seal body 54". To provide the outward centripetal force, a spring 60' (which can be assumed to include the effect of any gas pressure) is provided between the seal body 54" and the bottom wall 70' with the side walls of the groove 52'. The spring 60' is designed to exert an outward force (arrow F*s*) on the seal body 54" which is sufficient in magnitude to provide the centripetal force necessary to force the seal to travel along the convex paths at the point F and in addition to insure adequate contact pressure between the seal body 54" and the peripheral wall 18' in all positions of the seal body 54" along its path of travel.

Neglecting any friction between the seal body 54" and the side wall 68' of the slot 52', the contact pressure at point F is equal to the difference between the force F*s*, exerted by the spring 60' on the seal body 54", and the centrifugal reaction force occurring at point F. This relationship will hold at each point along the convex portion 64' of the peripheral wall 18'. At every other point, such as the concave portion 62 of the peripheral wall 18', however, the spring force and the centrifugal force (arrows F*s* and F'*c*, respectively) will both act in the same direction, urging the seal against the epitrochoidal inner surface 18'.

The contact pressure force of the seal body 54" against the curved surface A–G of the peripheral wall 18' at point C is equal to the sum of the spring force F*s* and the centrifugal force F'*c*. Therefore, along the concave portion 62' the seal contact pressure against the peripheral wall 18' is greater than the contact pressure at the convex portions 64'. Accordingly, if the contact pressure of the seal member 54" is adequate at a point on the convex portion 64', such as at point F, it may become excessive at points on the concave portion 62', such as point C.

Gas leakage past seals is a function of time. As the rotational rate increases, there is less time for gases to escape from the working chambers. Therefore, as the rate of rotation is increased, the necessity for close-sealing engagement between the apex seals 54 and the peripheral wall 18 diminishes. Sealing contact, useful at low speeds, will introduce at high speeds undesirable housing and seal wear and increase a loss of power due to friction.

The present invention, as will be explained below, is designed to provide adequate contact pressure of the apex seals against the peripheral wall at lower engine speeds, and to minimize contact pressure or relieve it entirely at higher speeds. This results in a decrease of wear of the housing and seals, and in improved engine efficiency at the higher speeds owing to the reduction of seal friction.

Figure 5:
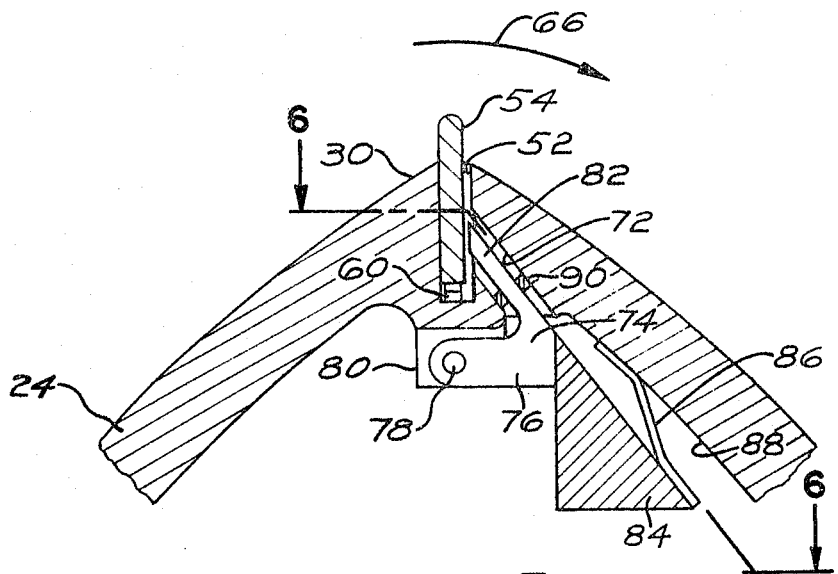
FIG. 5 is an enlarged view of an apex portion of the rotary engine of FIG. 1.
Figure 6:
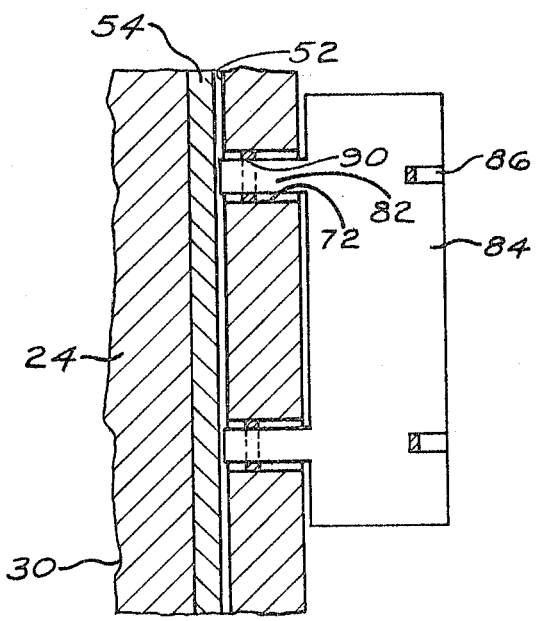
FIG. 6 is a sectional top view of the apex seal mechanism shown in FIG. 5, taken along the line 6—6, and looking in the direction of the arrows.

The device of the invention is shown in FIGS. 5 and 6. An apex seal 54 is shown positioned within a slot 52 of the rotor of the engine shown in FIGS. 1 and 2. In the slot under the seal is a leaf spring 60 which resiliently urges the seal radially outwardly. While the seal is traveling across the cusp of the epitrochoidal path (portion 64' of the curve shown in FIGS. 3 and 4) there is a centrifugal force toward the central axis, and the seal would leave the surface of the peripheral wall, except for the thrust of spring 60 and gas pressure in the slot which hold it in contact. However, when the seal is traveling around a concave portion of the curve (portion 62' in FIGS. 3 and 4) there is a centrifugally outward thrust of the mass of the seal added to the spring and gas pressure, resulting in high contact pressure of the seal against the peripheral wall.

This condition is tolerable at lower engine speeds where good sealing is desirable and the centrifugal thrust of the seal is not great enough to cause serious wear. However, at higher speeds the centrifugal thrust becomes much greater, although perfect sealing is no longer necessary owing to the fact that gas leakage is largely a function of time, as discussed previously. Therefore, there is provided a device responsive to centrifugal thrust which clamps the apex seal against a side wall of its slot at points of its path where its contact pressure against the peripheral wall is diminished or entirely relieved, which device holds it in the immobile clamped position during the concave portions of the path (62' in FIGS. 3 and 4).

In FIG. 5 there is shown an enlarged fragmentary section of the apex portion of a rotor. The apex portion has an internal cavity communicating by passages or channels 72 with the leading side of a seal groove 52; direction of rotation of the rotor is shown by the arrow 66. An inertia member 74 is positioned within the rotor apex cavity. The inertia member as viewed in profile has somewhat the shape of a lower case y, although any other convenient shape may be selected. One of the short arms 76 of the y is pivotally mounted by a pin 78 or similar means to a boss 80 borne by the rotor. The other short arm 82 is in the form of a clamping platen or finger which extends through the channel 72 and has a contact face in the vicinity of seal 54. In the rest position shown the contact face does not exert any pressure on the seal. The long arm or tail of the y is a weight member 84 extending generally in the leading direction of the rotor apex. One or more springs 86 are positioned between the weight 84 and the interior surface 88 of the rotor cavity, urging the weight member away from the cavity wall. As shown, the springs 86 are leaf springs, which may have one end fixed to the weight member and the other end free for sliding contact against the surface 88, or conversely they may be fixed to the rotor wall and have the other end free for sliding contact against the weight member. Each of the fingers 82 is surrounded by a resilient sealing ring 90 positioned within the passage 72 to prevent leakage of gas from the seal slot to the interior of the rotor.

When a rotor apex is traversing the cusp portion of the curve the centrifugal thrust of both the seal and the weight 84 of the inertia member 74 is inward in a direction generally toward the axis, and if the engine speed is high the thrust of the seal will be sufficient to overcome the outward urging of the seal spring 60 and gas pressure in the slots; thus the seal will leave the surface of the peripheral wall, or at transitional speeds between low and high the seal pressure will at least be lessened. At the inflection point of the epitrochoidal curve of the peripheral wall the direction of centrifugal force will change to generally radially outward. Since all portions of the rotor trace epitrochoidal paths, and since the weight 84 of the inertia device is positioned ahead of the seal, that is, in the leading direction, the weight will reach an inflection point before the seal does. Thus, the weight will swing from its pivot pin 78 toward the rotor wall before the seal is thrust centrifugally outwardly, and the clamping fingers 82 will press it firmly against the opposite slot wall. Therefore, throughout the concave portion of the travel path the seal will be held in its relieved position and will exert a much diminished pressure against the peripheral wall, or will be entirely free therefrom if the speed is high enough. When the weight reaches the next inflection point in its travel path it will swing inwardly, and the seal reaching the same inflection point immediately afterward will remain in its relieved position.

An inertia device is disposed within each apex portion, symmetrically arranged with respect to each other, the rotor axis 36, and the end faces of the rotor, in order to prevent an unbalanced condition of the rotor during operation. Although the inertia device is shown as having two pressure fingers 82, a larger number may be used, or a single one may serve if it has sufficient axial extent to apply clamping pressure to the seal across its longitudinal center to prevent it from cocking in its slot. Similarly, in place of the leaf spring 86 coil springs or other resilient means may be used.

The spring force of spring 86 is selected for a predetermined engine speed, so that at lower speeds the inertia device will not operate, but above the predetermined speed it will clamp the seal at a diminished contact pressure. The mass of the seal and the spring force of its spring 60 may also be selected so that at some higher predetermined speed the seal will be entirely relieved from contact pressure as it crosses the cusp of the epitrochoid; since the inertia device of course also operates at such higher speed, the seal will then be clamped at zero contact pressure.

What is claimed is:

1. In a rotary combustion engine of the type having an outer body defining an internal cavity having a central axis, the outer body having a peripheral wall with an inner surface of basically epitrochoidal profile, a rotor mounted in the cavity for rotation with respect to the outer body on a rotor axis planetating about the central axis, the rotor having a plurality of apex portions, the profiles of the rotor and the peripheral wall defining therebetween a plurality of variable-volume working chambers, each of the apex portions having a slot with a radially movable seal strip positioned therein for sealing against the peripheral wall, means for reducing the contact pressure of the seal strip against the peripheral wall, comprising:

(a) inertia means carried by the rotor for restraining radial movement of the seal strip, including
  (i) weight means responsive to forces acting generally radially with respect to the rotor axis, and
  (ii) clamping means actuated by the weight means for clamping the seal strip against a slot wall when the centrifugal thrust of the weight means is directed generally radially outwardly.

2. The combination recited in claim 1, wherein the inertia means is a rigid body bearing the weight means at one end thereof and the clamping means at the other end thereof and is pivotally mounted therebetween in such a manner that when the weight means swings in a generally radially outward direction the clamping means presses the seal strip against a slot wall.

3. The combination recited in claim 2 wherein the inertia means includes resilient means restraining the weight means from movement in the generally radially outward direction below a predetermined engine speed.

4. The combination recited in claim 3, wherein the inertia means is mounted within an interior cavity of the rotor, there is at least one passage communicating between the cavity and the seal slot with the clamping means extending through the passage, and sealing means disposed in the passage preventing leakage of gas from the seal slot to the rotor cavity.

5. The combination recited in claim 4, wherein there is an inertia means disposed at each of the rotor apexes and positioned on the leading side of its associated seal strip with respect to the direction of rotor rotation, the inertia means being symmetrically disposed with respect to each other and to the rotor axis.

6. The combination recited in claim 3, wherein the seal strip has resilient means urging it in a radially outward direction, the seal strip resilient means and the mass of the seal strip being selected so that at a predetermined engine speed lower than the engine speed at which the inertia means operates the contact pressure of the seal strip against the peripheral wall will be diminished as the seal strip crosses the cusp of the epitrochoid.

7. The combination recited in claim 6, wherein the seal strip resilient means and the mass of the seal strip are selected so that the contact pressure of the seal strip against the peripheral wall is reduced to approximately zero at engine speeds higher than the engine speed at which the inertia means operates.

References Cited

UNITED STATES PATENTS 3,169,695    2/1965    Wankel.

CORNELIUS J. HUSAR, Primary Examiner

U.S. Cl. X.R.

230—145